E. D. WOODS.
COMBINATION KNIFE AND FORK.
APPLICATION FILED AUG. 23, 1916.
1,229,696.
Patented June 12, 1917.
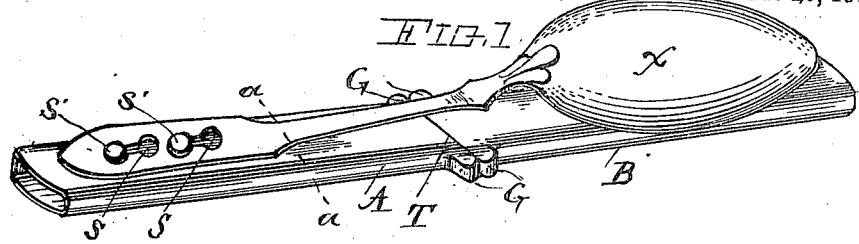
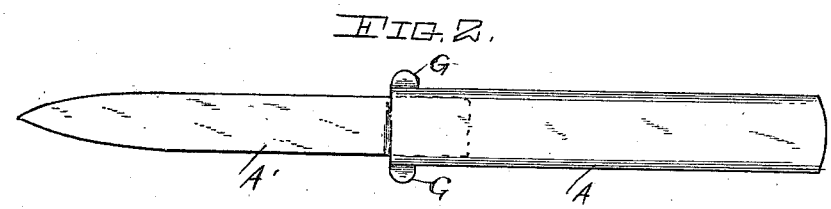
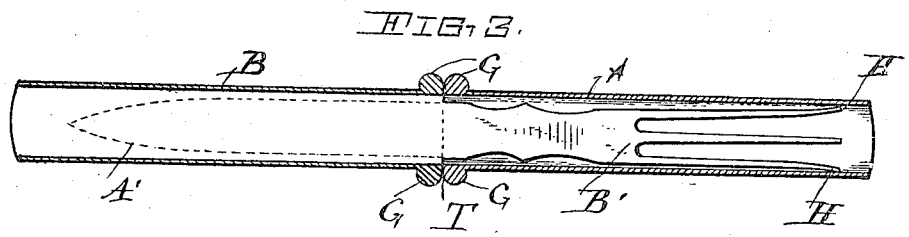
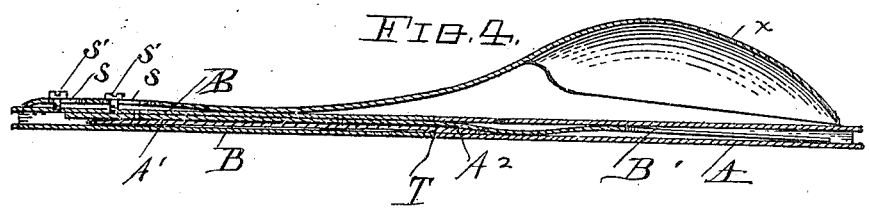
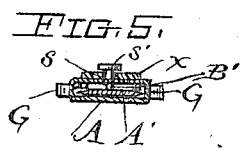
Inventor.
Edward D. Woods

UNITED STATES PATENT OFFICE.

EDWARD D. WOODS, OF CLEVELAND, OHIO, ASSIGNOR TO KOREN MANUFACTURING COMPANY, OF CLEVELAND, OHIO.

COMBINATION KNIFE AND FORK.

1,229,696.   Specification of Letters Patent.   Patented June 12, 1917.

Application filed August 23, 1916. Serial No. 116,431.

*To all whom it may concern:*

Be it known that I, EDWARD D. WOODS, a citizen of the United States, and resident of Cleveland, in the county of Cuyahoga and State of Ohio, have invented certain new and useful Improvements in Combination Knives and Forks, of which I hereby declare the following to be a full, clear, and exact description, such as will enable others skilled in the art to which it appertains to make and use the same.

The invention relates to a compact serviceable and secure form of table equipment for touring, picnics or military service including a closed package composed of eating utensils, and their handles made in the form of a double sheath with open passages therethrough which permit the circulation of hot water to cleanse and disinfect them and maintain them in a sanitary condition.

Heretofore handles for utensils such as knives and forks have been formed with closed pockets in which grease and soured food collects and which are very difficult to keep in a sanitary condition.

In the present invention the handles are formed of smooth flattened tubes made of sheet metal, and are open at both ends permitting air and water to flow through them freely.

This method of construction also permits the formation of lateral guards to protect the hands of the user.

The invention further comprises the combination and arrangement of parts and construction of details hereinafter described, shown in the accompanying drawings and specifically pointed out in the claims.

In the accompanying drawings Figure 1 is a perspective of the device in the closed position; Fig. 2 is a plan view of the knife and handle; Fig. 3 is a longitudinal central horizontal section of the device; Fig. 4 is a longitudinal vertical section; Fig. 5 is a transverse section on line $a$—$a$ Fig. 1.

In these views A, B, are the flat tubular handles of the knife A′ and fork B′ respectively, the handle of the knife forming the sheath for the fork, and the handle of the fork forming the handle for the knife.

The shank of the knife is attached at $A^2$ to one flat wall of its handle on the inner face thereof by riveting or spot welding or brazing, and the shank of the fork is similarly attached to the inner face of its respective handle.

The knife blade is inserted in the open space provided in the handle of the fork after securing its shank thereto, and the fork is inserted in the open space provided in the handle of the knife, thus overlapping the knife and fork.

When closed the device appears like a flattened tube and the two handles are butted together at T forming a close joint. Integral lateral guards G, G, are preferably formed upon the edges of the handles adjacent to the abutted ends to protect the hands from slipping. To give a firm frictional contact between the parts the tines of the fork are spread at H, H, to engage the walls of the knife handle.

When it is desired to carry a spoon with the equipment the handle of the spoon is provided with key hole slots S placed in line with each other, and one of the hollow handles is provided with heated rivets or studs S′, S′ over which the spoon handle is pressed, thus retaining the spoon in place by the resilient action of its curved handle.

This form of construction provides a generally useful pocket implement which is safe to carry on the person and which cannot easily become fouled by constant use, and contains unobstructed passages through which air and cleansing fluid can circulate.

Having described the invention what I claim as new and desire to secure by Letters Patent is:

1. A combination knife and fork equipment comprising, a pair of hollow tubular handles each open at both ends to permit circulation of cleansing fluid therethrough, a knife blade having its shank end secured to one inner side of its respective handle leaving an unobstructed longitudinal opening therethrough at the other side, a fork having its shank secured to one inner side of its respective handle leaving a longitudinal opening throughout said handle, the knife and fork respectively insertible in the openings in the opposite handles and overlapping each other when the parts are assembled.

2. A compact equipment composed of eating utensils comprising, a pair of tubular handles having unobstructed longitudinal openings extended entirely therethrough to permit circulation of a cleansing medium, a knife secured to one inner side of one handle, and a fork secured to one inner side of the other handle, said knife and fork each spaced from one side of its respective handle to permit the insertion of the other of said respective members, in said unobstructed opening and integral lateral extensions at the meeting edges of said tubular handles.

In testimony whereof, I hereunto set my hand this 26th day of July, 1916.

EDWARD D. WOODS.

In presence of—
Wm. M. Monroe,
Ralph M. Jeremiah.